United States Patent

[11] 3,571,851

[72] Inventors Robert W. Ackley;
Edwin L. Jette, Jr., Stonington, Conn.
[21] Appl. No. 844,039
[22] Filed July 23, 1969
[45] Patented Mar. 23, 1971
[73] Assignee Crompton & Knowles Corporation
Worcester, Mass.

[54] SELF-ALIGNING SEAL TIP FOR SPLICE BOX
6 Claims, 4 Drawing Figs.

[52] U.S. Cl. .................................................. 18/6
[51] Int. Cl. .................................................. B27f 1/10
[50] Field of Search ........................................ 18/6 (C)

[56] References Cited
UNITED STATES PATENTS
2,438,374 3/1948 Ramsey ........................ 18/6C
2,533,923 12/1950 Edwards et al. ............... 18/6C Primary Examiner—Granville Y. Custer, Jr.
Attorney—Howard G. Garner, Jr.

ABSTRACT: A continuous vulcanizing apparatus in which a splice box forming the entering portion of the vulcanizing chamber has an entering chamber with an inwardly tapering annular wall for receiving one end of the ball joint connector; and an extruder head has an exit chamber formed by an inwardly tapering annular wall for receiving the other end of the ball joint connector. The outer portions of the connector which contact the walls of the exit and entering chambers are spherical to permit relative motion between the connector and extruder head and between the splice box and connector. There is a bore through the connector to permit vulcanizable material to flow through the connector from the exit chamber to the entrance chamber.

PATENTED MAR 23 1971
3,571,851
SHEET 1 OF 2
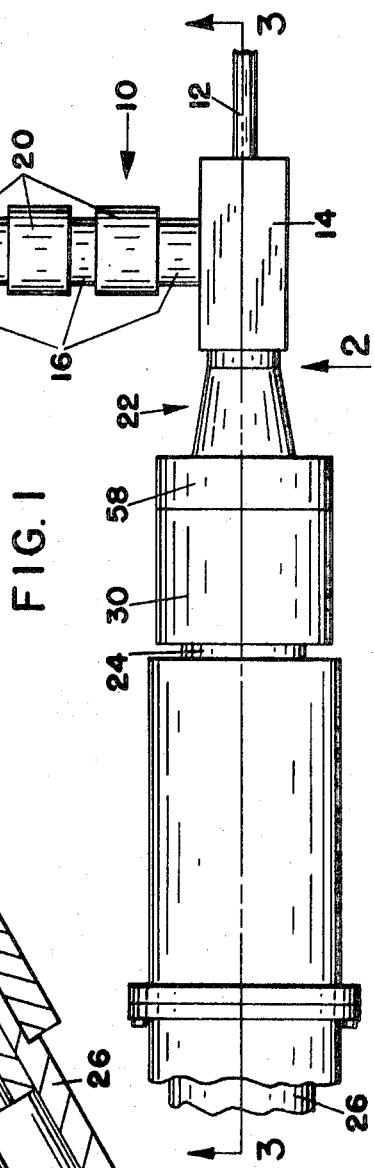
FIG. 1
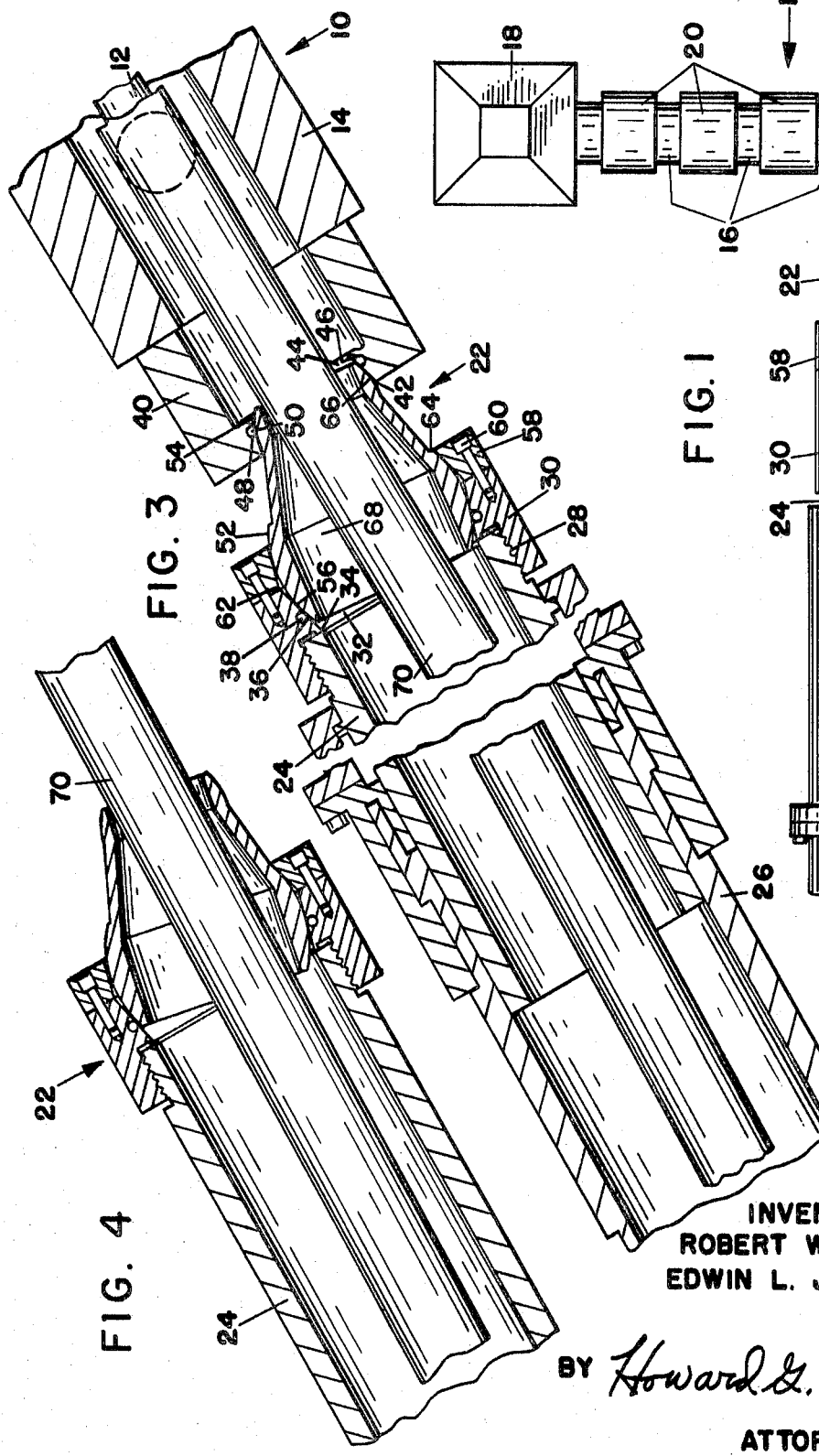
FIG. 3
FIG. 4
INVENTORS
ROBERT W. ACKLEY
EDWIN L. JETTE JR.
BY *Howard G. Garvey*
ATTORNEY

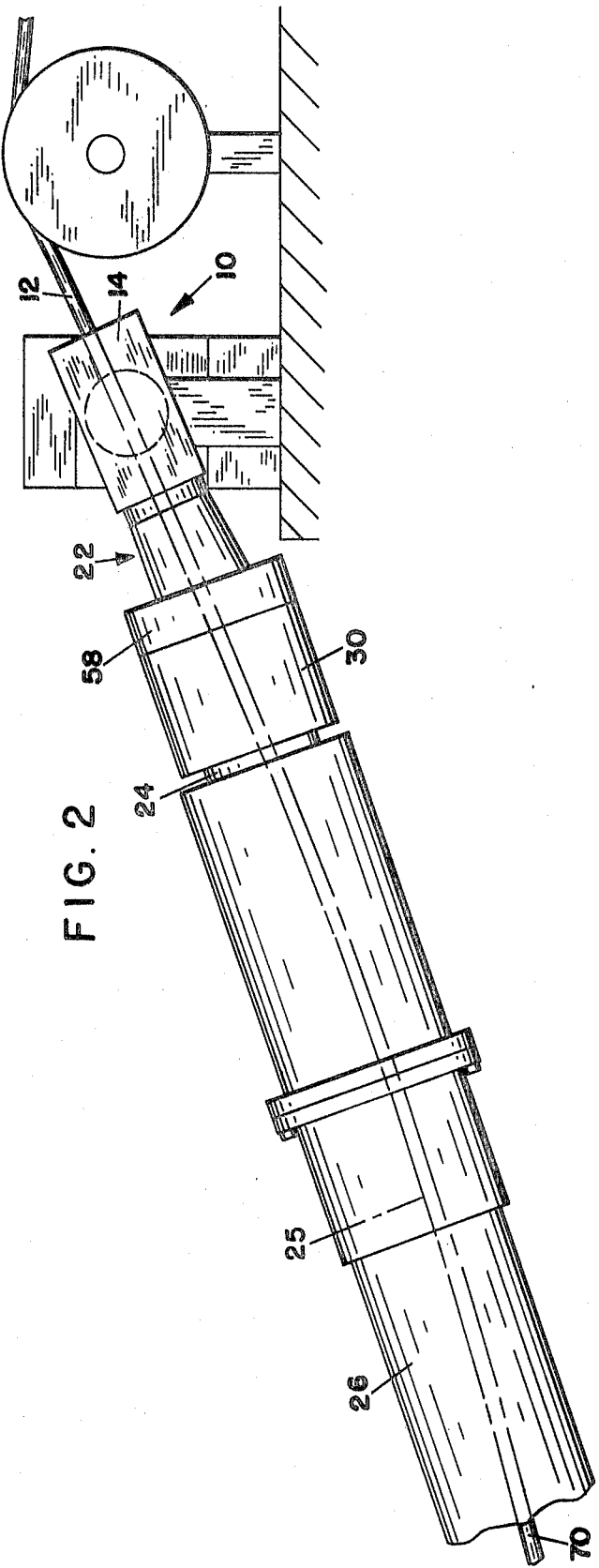

SELF-ALIGNING SEAL TIP FOR SPLICE BOX

BACKGROUND OF THE INVENTION

This invention relates to apparatus for continuously vulcanizing elongated vulcanizable material.

Elongated vulcanizable material, such as cables sheathed with vulcanizable rubber or rubberlike materials, are conventionally vulcanized by being introduced from an extruder head into an elongated chamber filled with steam at high pressure and temperature. The material is pulled through the chamber and, after it has become vulcanized, is then introduced into a cooling chamber. The vulcanized and somewhat cooled material is then withdrawn from the cooling chamber and is taken up and stored on a takeup reel.

A great number of vulcanizing systems have chambers which are disposed horizontally so that they are more readily accessible. Since the rubber or rubberlike material is tacky when it is extruded, the lower part of the cable is likely to be damaged if it rubs on the lower inner surface of the entering portion of the vulcanizing chamber.

Other systems dispose the vulcanizing chamber vertically to avoid damage to the cable. Since the chambers must have a length of at least 100 feet, the vertical chambers are very difficult to maintain.

The more modern continuous vulcanizing systems preserve the advantages of both the horizontal and vertical systems. In these systems, the entering portion is substantially in the form of a half-catenary wherein the material to be vulcanized enters the upper end of the catenary and progresses downwardly in general catenary form until it reaches a zone wherein it lies substantially tangential to the horizontal.

The continuous vulcanizing system, particularly if it is for the sheathing of a core such as a wire or cable, usually includes an operable section or splice box which is disposed close to the exit end of the extrusion head and at the entering end of the vulcanizing chamber. In such core sheathing systems, the core or material to be sheathed enters the extrusion head, and the sheathed core is discharged immediately into the entering end of the vulcanizing chamber. It is necessary in such systems to provide a means of opening the entering end of the vulcanizing chamber immediately beyond the extrusion head, as for permitting the trailing end of a length of sheathed core material to be spliced to the entering end of a new length of core to be sheathed. In order to provide adequate space for the operator to make a splice, it is necessary to open a substantial length of the vulcanizing chamber. This has been done by making one section of the conduit slidable within another in telescoping fashion. Sealing means are provided between the movable conduit section or splice box and the fixed section of the conduit cooperating therewith and with the extruder head.

Sealing of the splice box with respect to extruder head has always been an acute problem because of the high steam pressures in the vulcanizing chamber. It is difficult to achieve proper sealing between the splice box and the extruder head because of the many factors which may cause misalignment. Some of these factors are: machinery and manufacturing tolerance differences; assembly and installation errors; heat distortion in the splice box or extruder head; and expansion of the extruder barrel. This last factor is the most critical. The material to be extruded from the extruder head comes from an extruder barrel whose longitudinal axis is at right angles to the vulcanizing chamber. The material to be extruded is placed at one end of the barrel in an unmelted state and fed to the other or extruder end by a feed screw. Heaters are dispersed along the length of the barrel to melt the material as it is moved from one end of the barrel to the other. The melted material passes into the extruder head, or crosshead as it is sometimes referred to, where it is forced through a die and directed into the vulcanizing chamber. If a cable core is to be coated, it passes through the extruder head in a direction which is in line with the vulcanizing chamber and at a right angle to the longitudinal axis extruder barrel.

Due to the high temperature and the length of the extrusion barrel, there is a significant amount of expansion of the barrel. This expansion tends to force the extruder head in a direction which is at a right angle to the vulcanizing chamber, thereby causing the extruder head to be misaligned with respect to the splice box.

Misalignment of the extruder head and the splice box would be likely to prevent the sealing surfaces to meet or, if they did meet, they would not be parallel and steam leakage would occur.

SUMMARY OF THE INVENTION

It is a principal object of the present invention to provide a continuous vulcanizing apparatus in which the means to connect an extruder head and a splice box will overcome all of the above problems. The invention accomplishes this object by providing a novel splice box and extruder head configuration in which the splice box is connected to the extruder head by a universal joint connecting means.

The entrance to the splice box and the exit of the extruder head each have an annular, inwardly tapering wall for receiving respective spherical portions of the connecting means. The entrance and exit walls of the splice box and extruder head respectively each have an annular groove for receiving a sealing ring. Each sealing ring is disposed at a greater distance from its respective passageway opening than the point at which the spherical portion of the connecting means contacts the wall of the passageway. The sealing ring, however, is large enough to contact the spherical surface of the connecting means and provide a seal between the spherical surface and the passageway wall.

The connecting means has an inner bore or passage through which the extruded material can flow from the extruded head to the splice box.

The present invention permits the extruder head to be misaligned with the splice box without affecting the sealing characteristics of the connected parts.

Another advantage of the present invention is that the splice box and extruder head may be placed at different angles along the catenary of the cable. The crosshead may be disposed at its optimum angle with respect to the cable catenary, thus reducing part wear and helping to obtain concentricity between the cable and its insulation of extruded material. The splice box may also be placed at its optimum angle to allow for maximum clearance between the insulated cable and the inner splice box wall. This allows a larger cable to run than previously.

The inner tapered walls of the splice box and extruder head passageways are preferably made straight so that the respective spherical areas of the connecting will make a line contact with the walls.

An advantage of line contact between the respective spherical surfaces of the connecting means and the tapered surfaces of the splice box and extruder head passageways is that greater manufacturing and machining errors can be tolerated than would be possible if the walls were curved to match the curve of the spherical contacting portions of the connecting means.

Another advantage provided by the above line contact is that there is less heat transfer from the splice box to extruder die. Since the steam temperature in the splice box is much higher than the temperature of the die, it is very undesirable to have an excess amount of heat conducted from the splice box to the die. If the die gets too hot, vulcanization may occur in the extruder head. Since the connecting means is self-aligning, it can more closely match the cable size and the area of contact between the connecting means and the die holder is further reduced, thus further reducing the transfer of heat from the splice box to the die.

BRIEF DESCRIPTION OF THE DRAWINGS

The above and further objects and advantages will be more apparent from the following detailed description when read in connection with the accompanying drawings in which:

FIG. 1 is a schematic plan view of the entering portion of a continuous vulcanizing apparatus to which the invention is applied;

FIG. 2 is a side elevation looking in the direction of arrow 2 in FIG. 1 and showing the catenary shape of the vulcanizing chamber;

FIG. 3 is a longitudinal section on an enlarged scale, taken on line 3-3 in FIG. 1 and illustrating the invention; and FIG. 4 is a view similar to FIG. 3 and showing the splice box disconnected from the extruder head.

DETAILED DESCRIPTION OF THE INVENTION

Referring particularly to FIGS. 1 and 2, a continuous vulcanizing apparatus is partially shown and is generally indicated by the reference numeral 10. The cable core 12 which is to be coated by vulcanizable insulation material is led from the right in the direction of the arrow in FIG. 1 from a supply source, not shown. The core passes through an extruder or crosshead 14 wherein a coating of vulcanizable material is applied to the core. The material is supplied to the head 14 from an elongated extruder barrel 16. The material is fed to a hopper 18 in an unheated or dry state in the form of pellets or powder and then fed towards the head 14 by a mixing screw or the like within the barrel. As the material passes from the hopper 18 to the head 14 it is converted into a molten state by heaters 20. The molten vulcanizable material is forced through a die within the head 14 and is thereby applied as a uniform coating on the core 12 as it passes through the head. The coated core passes from the head through connecting means 22 into a splice box 24 where vulcanization of the coating on the core begins. The splice box 24 forms the entering portion of the vulcanizing chamber which is filled with steam at high pressure and temperature. The material to be vulcanized is pulled through the splice box into a first conduit section 26 which is connected to the splice box. The material then travels through successive conduit sections which are generally disposed along a catenary path indicated generally by the reference numeral 25 in FIG. 2. The material is then introduced into a cooling chamber which may form a prolongation of the vulcanizing chamber. The vulcanized and somewhat cooled material is then withdrawn and stored, the entire vulcanizing process does not form a part of the present invention and reference may be had to U.S. Pat. No. 3,108,321 to Ramsey et al. for a more detailed showing of the entire system. Details of an extruder head are shown in U.S. Pat.. Pat. No. 2,794,213 to B. H. Davis.

Referring to FIG. 3, the splice box 24 has a reduced threaded portion 28 for reception of a tubular fitting 30 which forms an entrance opening for the splice box. The fitting 30 has a frustoconical entrance passageway indicated at 32 and defined by an inwardly tapering annular wall 34. An annular groove 36 is formed in wall 34 and receives a sealing ring 38.

A die holder retainer 40 forms the exit portion of the head 14 and has an exit opening indicated at 42. Die holder retainer 40 has a frustoconical exit passageway indicated at 44. The wall 46 which defines the passageway 44 is inwardly tapered. There is an annular groove 48 in wall 46 for reception of a sealing ring 50.

The connecting means 22 has a first spherical outer surface portion 52 and a second outer spherical surface portion 54. Portion 52 fits within passageway 32 and contacts the wall 34 on an annular line indicated at 56 which is closer to the outer opening of fitting 30 than the sealing ring 38. The sealing ring 38, however, is lightly engaged by the surface 52 to make a seal between connecting means 22 and fitting 30. A retaining collar 58 is fastened to fitting 30 by one or more screws 60. Collar 58 has an inwardly tapered bore 62, the walls of which taper in a direction opposite from wall 34 when the collar is assembled.

During assembly, the connecting means 22 is placed within the passageway 32 and collar 58 is fastened to the fitting 30. When the collar 58 is in place, it forms a new opening to the splice box which has a smaller diameter than the largest diameter of spherical portion 52, the opening being indicated at 64. The connecting means 22 is therefore held in place before being connected to the extruder head 14.

Connecting means 22 is inserted into passageway 44 in the head 14. The spherical portion 54 is of such a diameter that it makes contact with the wall 46 on an annular line which lies between opening 42 and sealing ring 50. This annular line is indicated at 66 and is near enough to sealing ring 50 so that it engages the ring sufficiently to effect a seal between die holder retainer 40 and the connecting means 22.

Connecting means 22 has a bore 68 which allows the coated or insulation covered core, indicated at 70, to pass from the extruder head 14 to the splice box 24.

During full operation of the continuous vulcanizing apparatus, the steam pressure in the vulcanizing chamber will force the splice box 24 toward the upper right as viewed in FIG. 3. The splice box, in turn, bears against connecting means 22 forcing it toward the right against the surface 46 of die holder retainer. 40. Steam is prevented from escaping through the seals 38 and 50 since any steam pressure on the seals from within passageways 32 and 44 has a tendency to force the seals between the connecting means 22 and surfaces 34 and 46, respectively. As steam pressure increases, the contacting pressure at contact lines 56 and 66 increases and there is a greater force exerted on the seals to force them through the contact lines. An increase in steam pressure, therefore, results in increasing sealing capacity.

In view of the above description together with the showing in FIG. 3, it is evident that the connecting means 22 will maintain a seal between splice box 24 and head 14 over a wide range of misalignment between the head and splice box. The connecting means 22 can change its position relative to the extruder head and the splice box and yet the lines of contact at 56 and 66 will remain the same due to the spherical nature of surface portions 52 and 54, respectively.

When it becomes necessary to disconnect the splice box from the extruder head for any reason, the splice box is telescoped into the first conduit section 26 so that the operator can make a repair or splice a cable. As seen in FIG. 4, the connecting means 22 can be adjusted to a greater angle with respect to the splice box than that shown in FIG. 3, so that it does not interfere with the coated core 70.

We claim:

1. A continuous vulcanizing apparatus comprising:
    a. an elongated vulcanizing chamber which is in the form of a half-catenary and through which vulcanizable material travels;
    b. a splice box conduit which forms the entering portion of said chamber and which has an annular material receiving passageway and an annular entry opening for said passageway;
    c. an extruder head having an annular exit passageway and an annular exit opening for said exit passageway from which vulcanizable material emerges; and
    d. universal ball joint connecting means having a bore extending therethrough and external spherical surface portions for engagement with said entering and exit passageways to permit relative pivoting movement between the ball joint and extruder head and between the ball joint and splice box, and to permit the passage of said vulcanizable material through the bore in said ball joint connecting means from said extruder head to said splice box.

2. The vulcanizing apparatus as described in claim 1 wherein the walls defining said annular exit and entrance passageways taper inwardly from the respective openings of said exit and entrance passageways.

3. The vulcanizing apparatus as described in claim 2 further comprising means for applying pressure against said splice box in a direction which forces said spherical surface portions into engagement with the tapered surfaces in said entrance and exit passageways.

4. The vulcanizing apparatus as described in claim 3 further comprising retaining means for holding said universal ball joint connecting means in engagement with the tapered surface of said entrance passageway for assembly of said vulcanizing apparatus and during the absence of said pressure.

5. The vulcanizing apparatus as described in claim 2 wherein said exit and entrance passageways each have an annular notch, each of said notches being spaced from its respective passageway opening at a distance which is greater than the point at which the respective spherical sections of said universal joint contact the walls of said exit and entrance passageways, respectively; said vulcanizing apparatus further comprising sealing rings for insertion in said notches.

6. The vulcanizing apparatus as described in claim 2 wherein said exit and entrance passageways are frustoconical.